F. Ashley,
Clothes Sprinkler.

Nº 59,158.     Patented Oct. 30, 1866.

Witnesses:

Inventor:
F. Ashley
Per Munn & Co.
Attorneys

UNITED STATES PATENT OFFICE.

FREDERICK ASHLEY, OF NEW YORK, N. Y.

IMPROVEMENT IN CLOTHES-SPRINKLERS.

Specification forming part of Letters Patent No. 59,158, dated October 30, 1866.

*To all whom it may concern:*

Be it known that I, FREDERICK ASHLEY, of the city, county, and State of New York, have invented a new and Improved Clothes-Sprinkler; and I do hereby declare that the following is a full, clear, and exact description thereof, which will enable others skilled in the art to make and use the same.

The present invention relates to a novel and useful hand device or implement to be employed for sprinkling clothes previous to being ironed; and it consists in combining with a closed cylindrical-shaped vessel or reservoir for the water used, having an opening in one of its ends for convenience in filling or partially filling it with water, a projecting spout or tube at or near such end and upon one of its sides, which spout is perforated at its outer end, so that having filled, or nearly so, the said reservoir through the opening at its end, and then closed the same with any suitable stopper or cover, if the reservoir be then shaken with the hand, the water will be thrown out through the perforations of its spout in greater or less quantities, according to the force with which the reservoir is so shaken, as will be apparent from the following detail description of the implement, reference being had to the accompanying plate of drawings, in which—

Figure 2:
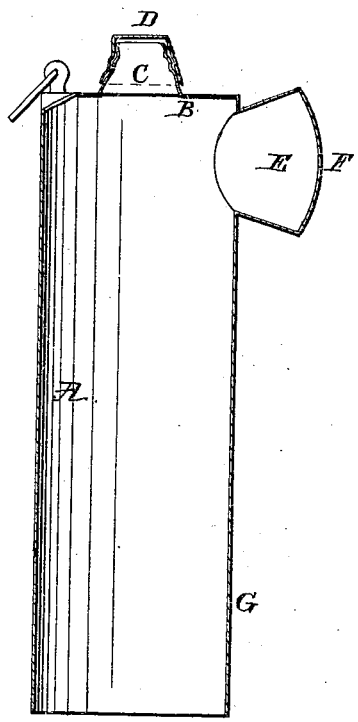
Figure 1:
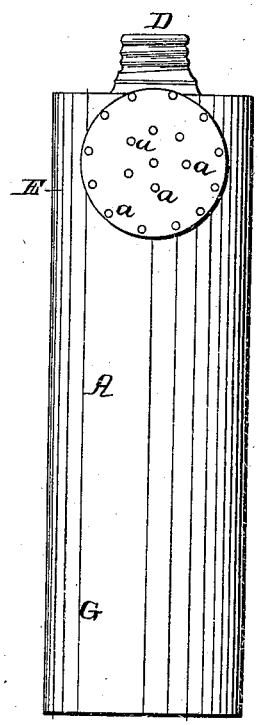

Figure 1 is a side and exterior view of the same, and Fig. 2 a central vertical section taken in the direction of its length.

A in the drawings represents the water reservoir or vessel, made of a cylindrical or other suitable shape, but of such a size as to be conveniently handled and grasped by the hand, and of sheet tin, brass, or any other metal or other suitable material. This vessel A is closed at both ends, but at one end, B, provided with an opening or nozzle, C, having a screw cap or cover, D, through which opening the water with which the vessel is to be filled is poured into the same.

E is a spout or tube projecting from one side of the vessel A, at or near its end B, the outer end of which spout is closed with a plate, F, having a series of small perforations, $a\ a$, of any desired number or size.

When the device or implement above explained is to be used it is first filled, or nearly so, with water by removing its screw-cap D, which cap is then replaced and the vessel taken in the hand by its end or portion G, and shaken with sufficient force to cause the water to be thrown out of its perforated spout or tube E upon the clothes which are to be sprinkled, the quantity or amount of water so thrown out or sprinkled depending upon the force with which the vessel is shaken, as is obvious without further explanation, the vessel, after being emptied of its contents, being filled again, as above explained, and so on as long as desired.

I claim as new and desire to secure by Letters Patent—

The arrangement of the spout E, with the perforated plate F, and the nozzle C, with the screw-cap D, in combination with the reservoir A, combined and operating in the manner and for the purpose herein specified.

The above specification of my invention signed by me this 12th day of March, 1866.

FREDK. ASHLEY.

Witnesses:
　M. M. LIVINGSTON,
　ALBERT W. BROWN.